United States Patent [19]

Walker

[11] 4,432,400

[45] Feb. 21, 1984

[54] COIL INSERTION METHOD AND APPARATUS USING NON-PARALLEL BLADE GAPS

[75] Inventor: Robert G. Walker, Ossian, Ind.

[73] Assignee: Industra Products, Inc., Fort Wayne, Ind.

[21] Appl. No.: 285,429

[22] Filed: Jul. 20, 1981

[51] Int. Cl.$^3$ .............................................. B21F 3/00
[52] U.S. Cl. ...................................... 140/92.1; 29/596
[58] Field of Search .................... 140/92.1, 92.2, 92.9; 29/734, 735, 606, 596, 732, 736

[56] References Cited

U.S. PATENT DOCUMENTS

| | | | |
|---|---|---|---|
| 3,507,029 | 4/1970 | Stuckey et al. | 29/596 |
| 3,689,976 | 9/1972 | Donovan | 29/736 |

Primary Examiner—Francis S. Husar
Assistant Examiner—Linda McLaughlin
Attorney, Agent, or Firm—Jeffers, Irish & Hoffman

[57] ABSTRACT

A coil inserting blade array has a first position in which the distal ends of a group of adjacent blades extend into the coil form recess with the two gaps at the sides of the group exposed to the angled section-shaping portions so that a coil wound on coil form may be transferred to the array with angled sections extending through the two gaps and one end section disposed within the array. The array has a second position with the distal ends of the blades extending into the bore of the core and engaging teeth thereof, and with the two gaps communicating with two winding slots, the two gaps defining a first angle therebetween. The angled section-shaping portions of coil form define a second angle therebetween slightly smaller than the first angle and having a center spaced outwardly from the centerline of the array on the side thereof remote from the one end section in the first position of the array. The facing sides of each pair of adjacent blades which define the gaps diverge toward the center of the array so that the coil on the blades may be pivoted to an insertion position defining an acute angle with the blades with the two angled sections of the coil defining a third angle therebetween slightly larger than the first angle and the projected centerlines of the angled sections meeting at a point spaced inwardly from the centerline of the array.

26 Claims, 9 Drawing Figures

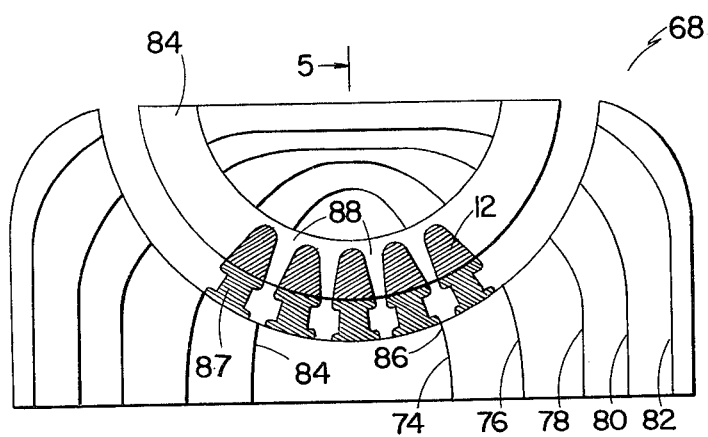
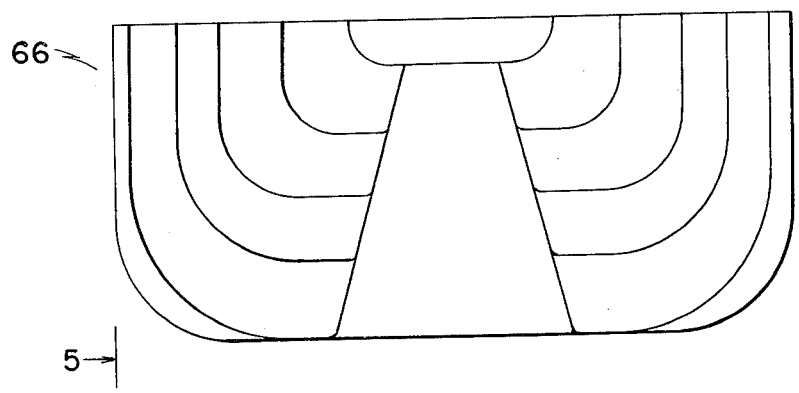
Fig. 4

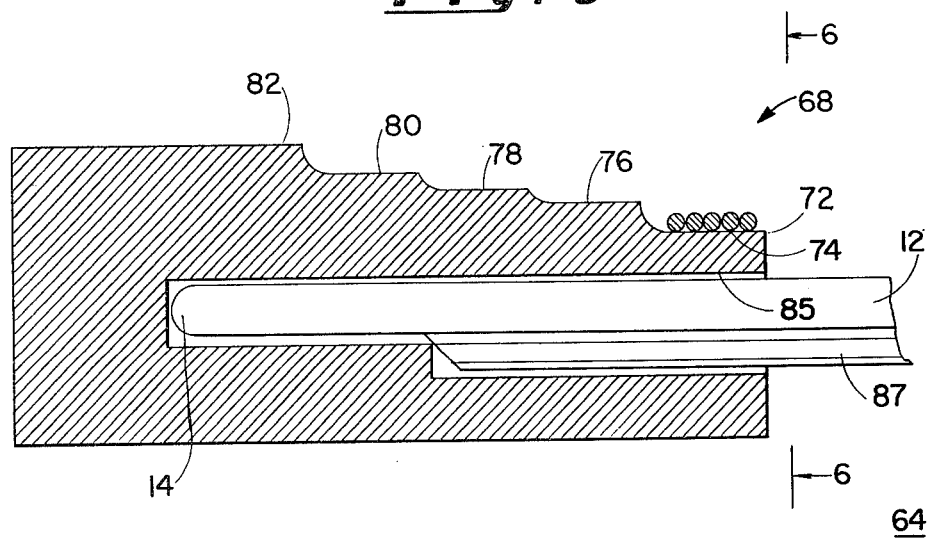
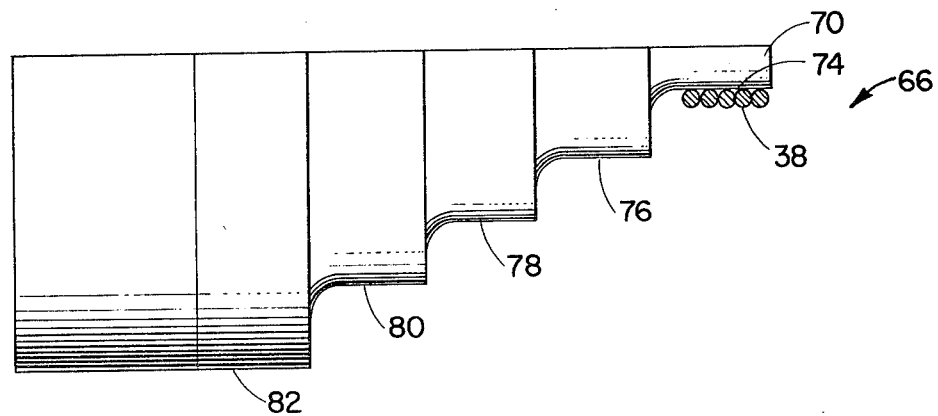

COIL INSERTION METHOD AND APPARATUS USING NON-PARALLEL BLADE GAPS

BACKGROUND OF THE INVENTION

1. Field of the Invention

This invention relates generally to methods and apparatus for precision winding single-layer dynamoelectric machine field coils and for inserting the coils in an internally-slotted core member. More particularly, the invention relates to such a method and apparatus in which the gaps between the blades of the insertion apparatus are non-parallel.

2. Description of the Prior Art

Apparatus for inserting dynamoelectric machine field coils into an internally-slotted core member is well known to those skilled in the art, being shown for example in U.S. Pat. No. 3,324,536. Such apparatus conventionally comprises a cylindrical array of elongated, parallel blade elements respectively having distal ends and defining equal-width gaps therebetween which are radially aligned with the centerline of the array. A coil is draped over the distal ends of a group of the blade elements with angled sections of the coil extending through the two gaps on either side of the group of blade elements, the angled sections being respectively joined to end sections disposed within and outside of the array. The array of blade elements is then positioned in the bore of the core member with the blade elements respectively engaging the inner ends of the teeth thereof and the gaps communicating with the winding slots. The coil on the group of blade elements is then pushed into and through the bore of the core member causing the sides of the coil to enter the two slots which communicate with the two gaps on either side of the group of blade elements.

The following U.S. patents known to the present applicant appear to illustrate such inserter apparatus in which the sides of the blade elements which define the gaps therebetween are non-parallel and diverge toward the center of the array of blade elements:

U.S. Pat. No. 3,324,536 (FIG. 9)
U.S. Pat. No. 3,625,261 (FIG. 4)
U.S. Pat. No. 3,828,830 (FIG. 6)
U.S. Pat. No. 3,402,462 (FIG. 2)
U.S. Pat. No. 3,481,372 (FIG. 19G)

However, none of the above-enumerated patents contain any written disclosure of non-parallel gaps and, in fact, in the same drawing figure of each of the above-enumerated patents, some of the gaps are shown as being defined by parallel blade element sides while other gaps are shown as being defined by non-parallel, diverging blade element sides. Furthermore, to the best of the present applicant's knowledge and belief, the apparatus shown in the above-identified patents as actually manufactured by the assignees thereof employed parallel-sided blade gaps and I thus conclude that the showing in those patents of blade gaps having non-parallel, diverging sides is the result of draftmens' inadvertance. The assignee of the present application has manufactured insertion apparatus employing half-round blade elements, however, that apparatus was employed for inserting coils wound with many turns to very fine wire.

Such insertion apparatus is sometimes employed for inserting single layer, precision-wound coils in which the diameter of the wire closely approaches the width of the blade gaps. In the past, such coils have been wound on forms which shape the coils to have angled sections defining the same angle therebetween as the two blade gaps through which such angled sections extend. When such coils are positioned on the blades of the insertion apparatus, the coils define substantially a 90° angle with the blades whereas, for proper insertion, the coils should hang from the blades to define an angle no greater than 45°, and preferably smaller, with respect to the blade elements. With such single layer, precision-wound coils defining an angle of nearly 90° with the blades, upon insertion the upper wires of the coils impinge upon the cuffs of the slot liners and must be bent by nearly 90° to align with and enter the stator slots. The force required to bend the coil by nearly 90° frequently damages the cuffs of the slot liners and may flex the blades thus increasing the possibility of wire damage on the lips of the blades. In an effort to eliminate such damage to the slot liner cuffs, prior insertion apparatus has included cuff protector elements which, however, add to the complexity and cost of the apparatus.

Inspection of the geometry involved in inserting single layer, precision-wound coils in which the wire diameter closely approaches the width of parallel-sided blade gaps reveals that while the angled sections of the coil may be positioned in respective radially aligned, parallel-sided slots with the coil disposed in a plane normal to the axis of the array of blades, an attempt to pivot the coil so that it is disposed in a plane defining an acute angle with the blades results in the point at which the projected centerlines of the angled sections of the coil meet when extended to the former horizontal plane of the coil moving radially outwardly from the centerline of the bore toward the periphery of the array so that the projections of the angled sections of the coil define an angle greater than the angle defined by the two slots, thus inhibiting such pivoting of the coil to an inclined position with respect to the blades. In order to overcome this problem, single layer coils have been precision wound with the two angled sections defining an angle therebetween slightly smaller than the angle defined between the respective two parallel-sided blade gaps and with the projected centerlines of the two angled sections meeting at a point spaced radially outwardly from the centerline of the array of blades on the side remote from one end section when the coil is in a plane normal to the centerline of the array. Thus, when the coil is pivoted so as to be inclined with respect to the blades, the projections of the two angled sections of the coil will define the same angle as the angle defined by the two blade gaps, thus permitting the thus inclined coil to be positioned on the blades with the two angled sections extending through the respective two blade gaps. Such coils have been transferred from the coil form on which they are wound to a hand transfer tool of the type shown in U.S. Pat. No. 3,686,735 and then transfered to the inserter blades, the geometry of the pins employed in the hand transfer tool permitting manipulation of the coils following winding to the requisite inclined position.

In recent years, such single layer, precision-wound dynamoelectric machine field coils have been wound and inserted using so-called wind and shed apparatus of the general type shown in U.S. Pat. No. 3,514,837. In an apparatus of that type, the coils are wound on coil forms having a recess formed in the distal end thereof, the recess also communicating with the side portions which shape the angled sections of the coils which later extend through the two blade gaps of the insertion apparatus defining the group of blades around which the coil is draped. As the coil is being wound on the coil form progressing inwardly from the distal end, the ends of the group of blades around which the coil is to be draped are progressively inserted into the coil form recess and the coils are progressively stripped from the coil form onto the blades. With this type of apparatus, since the coils are transferred to the blades at substantially a 90° angle with respect thereto, it is necessary to wind the coils with the angled sections defining the same angle therebetween as the angle defined by the two parallel-sided blade gaps through which the two angled sections extend and thus, it is not possible to wind the coil with the two angled sections defining a smaller angle therebetween than the angle defined by the blade gaps in order to permit inclination of the coils with respect to the blades, as above described.

It is accordingly an object of the invention to provide a method and apparatus of winding single layer, precision-wound dynamoelectric machine field coils and for inserting the same in an internally-slotted stator core member in which the coils may be wound from wire having a diameter closely approaching the width of the blade gaps and nevertheless be inclined with respect to the blades for insertion without damaging the cuffs of the slot liners or flexing the blades.

SUMMARY OF THE INVENTION

In accordance with the invention in its broader aspects, a method of winding dynamoelectric machine field coils and inserting the same in an internally-slotted core member is provided which uses coil insertion apparatus having a cylindrical array of elongated, parallel, cricumferentially spaced blade elements which define equal-width gaps therebetween respectively radially aligned with the centerline of the array, the blade elements respectively having distal ends. The coil is single-layer, precision wound with two converging angled sections respectively joined to opposite end sections with the wire from which the coil is wound having a diameter closely approaching the width of the gaps. The array is moved relative to the coil to a first position in which the distal ends of a group of adjacent blade elements extend into the coil generally at right angles thereto with the angled sections of the coil respectively extending through the two gaps respectively adjacent the outer blade elements of the group and with one end section of the coil disposed within the array, the two gaps defining a first angle therebetween. The array with the coil on the group of blade elements is then moved relative to the core member to a second insertion position with the blade elements extending into the bore of the core member and the coil is pivoted on the group of blade elements to a position defining an acute angle therewith, and the coil is then inserted in the core member slots. In accordance with the invention, at least the two gaps through which the angled sections of the coil extend are provided with sides which diverge toward the center of the array, and the coil is wound with the two angled sections defining a second angle therebetween slightly smaller than the first angle and with the projected centerlines of the angled sections meeting at a first point spaced outwardly from the centerline of the array on the side thereof remote from the one end section of the coil when the array is in its first position. The two angled sections of the coil define a third angle therebetween slightly larger than the first angle and the projected centerlines of the angled sections meet at a second point spaced inwardly from the centerline of the array on the side thereof toward the one end section of the coil when the array is in its insertion position.

In the apparatus of the invention, the facing sides of each pair of adjacent blade elements diverge toward the center of the array to define an angle therebetween which is generally bisected by a radius of the array extending through the respective gap.

It is accordingly an object of the invention to provide an improved method of winding single layer, precision-wound dynamoelectric machine field coils and for inserting such coils in an internally-slotted core member.

Another object of the invention is to provide improved apparatus for winding single layer, precision-wound dynamoelectric machine field coils and for inserting such coils in an internally-slotted core member.

A further object of the invention is to provide an improved method and apparatus of the wind and shed type for winding single layer, precision-wound dynamoelectric machine field coils and for inserting the same in an internally-slotted core member with the diameter of the wire from which the coils are wound closely approaching the width of the blade gaps of the insertion apparatus.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 4 is a front view of a coil form which may be used in practicing the invention;

FIG. 5 is a side view, partly in cross-section, taken generally along the lines of 5—5 of FIG. 4 and also showing an inserter blade extending into the recess in the coil form;

DESCRIPTION OF THE PREFERRED EMBODIMENT

Figure 1:
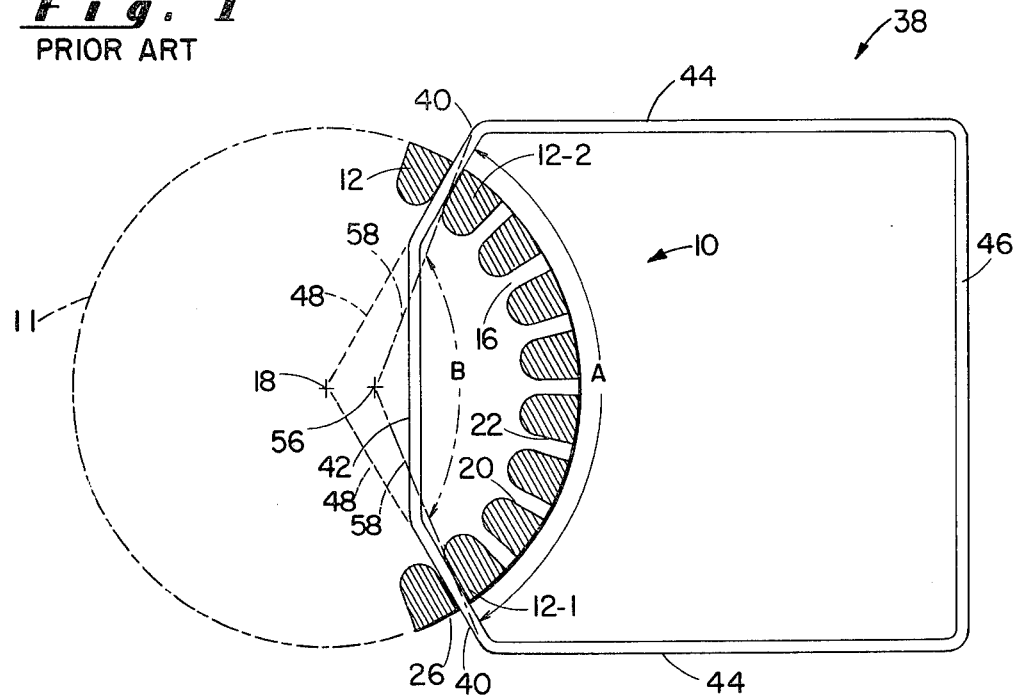
FIG. 1 is a cross-sectional view showing one turn of a coil positioned on a group of blades of conventional insertion apparatus where the diameter of the wire from which the coils is wound closely approaches the width of the blade gaps.
Figure 2:
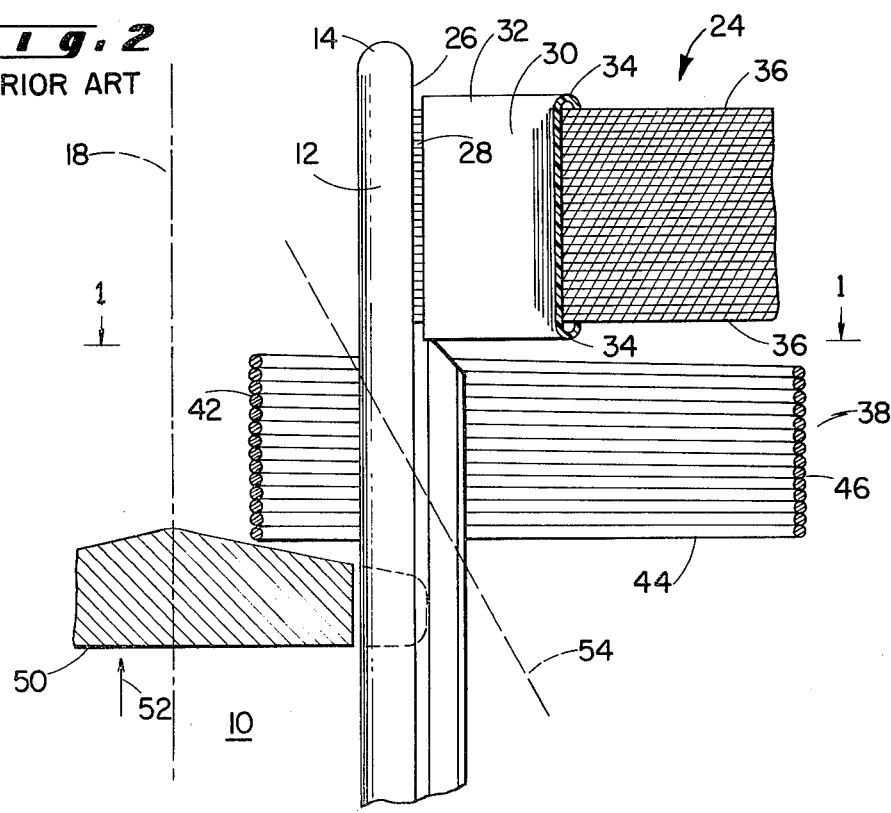
FIG. 2 is a fragmentary side cross-sectional view of conventional coil insertion apparatus, as shown in FIG. 1, having single layer, precision-wound coils positioned on the blades thereof where the diameter of the wire from which the coil is wound closely approaches the width of the parallel-sided blade gaps.

Referring now to FIGS. 1 and 2 of the drawings, there is shown, generally indicated at 10, a portion of conventional coil insertion apparatus of the type further illustrated and described in the aforesaid U.S. Pat. No. 3,324,536. Apparatus 10 comprises a cylindrical array, shown in dashed lines at 11 of elongated, parallel, circumferentially-spaced blades 12 having distal ends 14 and respectively defining gaps 16 therebetween respectively radially aligned with centerline 18 of the cylindrical array of blades 12. As discussed above, in conventional insertion apparatus, blades 12 have flat parallel sides 20, 22 which respectively define gaps 16 therebetween. Distal ends 14 of blades 12 are adapted to enter the bore of internally-slotted dynamoelectric machine stator core member 24 with their outer sides 26 respectively engaging the inner ends of teeth 28 and gaps 16 communicating with winding slots 30. Insulative slot liners 32 are conventionally seated in slots 30 and have cuff portions 34 respectively engaging opposite sides 36 of core member 24.

It is sometimes desired to employ insertion apparatus 10 to insert single layer, precision-wound coils in the slots of a stator core member where the diameter of a wire from which the coils are wound closely approaches the width of parallel-sided blade gaps 16; such a coil is shown at 38 in FIG. 1. A precision-wound coil is one in which the turns of wire forming the coil are wound in directly abutting fashion, as shown in FIGS. 2 and 5. Coils 38 are wound on coil forms shaped to form coil 38 with straight, converging angled sections 40 respectively joined to end section 42 and side sections 44 which, in turn, are joined to end section 46. Prior to insertion, coil 38 is placed on blades 12 with angled sections 40 extending through a respective pair of gaps 16 and with end section 42 disposed within the array of blades 12, angled section 40 thus spanning a predetermined number of blades 12, as shown in FIG. 1. Conventionally, coils 38 have been wound with angled sections 40 defining an angle A therebetween equal to the angle defined by a radially-extending centerlines of gap 16, as shown in dashed lines at 48 in FIG. 1.

During insertion of a coil on blades 12 of insertion apparatus 10, stripper member 50 is moved in the direction shown by arrow 52 thereby to push the end turns of the coil through the interior of the cylindrical array of blades 12 and through the bore of the core with sides 44 of the coil thus entering the slots as further described in the aforesaid U.S. Pat. No. 3,324,536. For best insertion with the least force required, the coils desirably should hang on blades 12 at an angle of at least 45° with respect to the adjacent side 36 of core member 24, as shown by the dashed line 54 in FIG. 2; preferably, the coil on blades 12 should hang at an angle of 60° or more with respect to the core.

Referring specifically to FIG. 1 of the drawings, in the case of a single layer, precision-wound coil 38 wound from wire having a diameter closely approaching, i.e., only slightly less than the width of parallel-sided gaps 16, it will be seen that with the angle A defined by angled sections 40 being equal to the angle defined by the respective two parallel-sided gaps 16, coil 38 may be placed over distal ends of blades 12 with coil 38 disposed in a plane perpendicular to axis 18 and blade 12. However, when an effort is made to pivot coil 38 to an inclined position, as shown in dashed lines 54 of FIG. 2, it will be seen that the projection of point 56 at which the projected centerlines of angled sections 40 meet will more radially with respect to centerline 18 toward the group of blades 12 spanned by sections 40 with the result that the projected centerlines of angled sections 40 when projected onto the original plane normal to axis 18, as shown by the dashed lines 58 in FIG. 1, will define an angle B larger than angle A. However, with the diameter of the wire from which coil 38 is wound closely approaching the width of the parallel-sided slot 16, such pivotal movement is inhibited by engagement of angled sections 40 with inner sides 20, 22 of the respective blades 12—1, 12—2 with the result that coil 38 when positioned on blades 12 necessarily assumes a position nearly parallel with the adjacent side 36 of core 24, i.e., approaching a ninety-degree (90°) angle with respect to blades 12 as shown in FIG. 2. It will now be readily seen that in this attitude of coil 38, coil 38 is required to bend by nearly 90° about cuff portions 34 resulting in damage to the cuff portions and requiring substantial force in direction 52 which may even result in flexing of blades 12.

Figure 3:
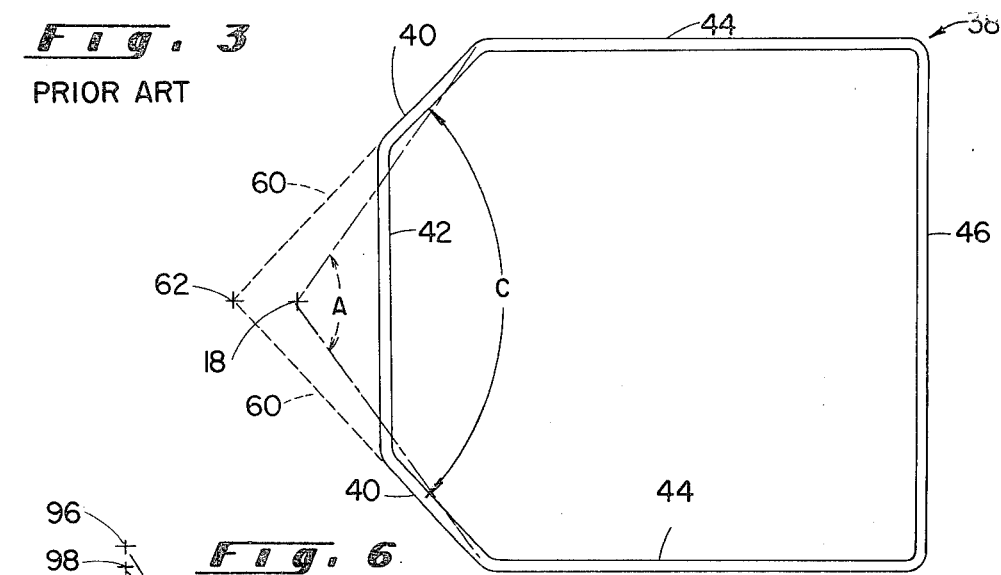
FIG. 3 is a plan end view of a coil wound so as to be positioned on the blades of conventional coil insertion apparatus having parallel-sided blade gaps so that the coil may be inclined with respect to the blades as shown in dashed lines in FIG. 2.

Referring now to FIG. 3, in order to overcome the problem discussed above, coils 38 have been wound with angled sections 40 defining an angle C slightly smaller than angle A defined between a respective pair of parallel-blade gaps 16, and with the projected centerlines of angled sections 40, as shown by dashed lines 60 in FIG. 3, meeting at point 62 spaced outwardly from centerline 18 on the side thereof remote from end section 42 with coil 38 in a position normal to axis 18. Such coils have been transferred from the coil form to a hand transfer tool of the type shown in the aforesaid U.S. Pat. No. 3,686,735, and then transferred to blades 12, the configuration and spacing of the pins employed in the hand transfer tool permitting manipulation of coils 38 prior to transfer to inserter blades 12 to the desired angle of inclination with respect to blades 12, thus causing point 62 to move to coincidence with centerline 18 so that angled sections 40 will enter the respective pair of parallel-sided slot 16 with the coil in the proper insertion attitude, as shown in dashed lines 54 of FIG. 2. Insertion of those coils thus requires less bending of the coil to align sides 44 with stator slots 30 resulting in the use of lower insertion pressure, reduced damage to slot liner cuffs 34, reduced damage to the wire due to being bent around the blade lips and less blade distortion which, in turn, may result in increased blade life.

In the so-called wind and shed type of apparatus, of the general type shown in the aforesaid U.S. Pat. No. 3,514,837, the blades of the insertion apparatus enter a recess in the coil form and the coils wound on the coil form are then stripped or shed onto the inserter blades, the blades being at right angles to the plane of the convolutions of the coil at the time of transfer thereto. Thus, when a single layer, precision-wound coil, wound from wire having a diameter closely approaching the width of parallel-sided gaps 16, is wound on a coil form of such wind and shed apparatus with the angle defined by angled coil sections 40 being equal to the angle defined between a respective pair of parallel-sided gaps 16, as shown at A in FIG. 1, while the coil may be transferred to inserter blades 12, it cannot thereafter be pivoted to the desired inclined position as shown by dashed line 54 in FIG. 2, as above-described. On the other hand, if such coils are wound with angled sections 40 defining an angle C slightly smaller than the angle A defined by the respective pair of parallel-sided gaps 16, as shown in FIG. 3, the coils cannot be transferred to blades 12 having such parallel-sided gaps 16.

Referring now to FIGS. 4, 5 and 6 and 7 of the drawings, the wind and shed apparatus includes a coil form, generally indicated at 64 comprising collapsible parts 66, 68, as is well known to those skilled in the art. Coil form parts 66, 68 have distal ends 70, 72 and comprise a plurality of progressively larger steps 74, 76, 78, 80 and 82 for winding progressively larger concentric coils thereon, the smallest step 74 terminating in distal ends 70, 72, as best seen in FIGS. 5 and 7A. A single layer, precision-wound coil 38 is shown on step 74 in FIGS. 5 and 7A.

Each step 74 through 82 of coil form part 68 has side portions 84, 86 shaped to form angled sections 40 of the progressively larger coils 38 respectively wound thereon, coil form part 66, 68 having other side portions shaped to form end sections 42, 46 and sides 44 of the respective coils 38. Coil form part 68 has arcuate recess 85 formed in distal end 72 and communicating with angled section-shaping side portions 84, 86 of each step 74 through 82. Recess 85 is proportioned to receive distal ends 14 of blades 12, and also to receive conventional wedge guides 87, as shown in FIG. 5. As best seen in FIG. 4, divergent blade gaps 88 of the invention are exposed to portions 84, 86 of each progressively larger coil form step 74 through 82 thereby to permit transfer of the wound coils to blades 12 as it is well known to those skilled in the art.

Figure 6:
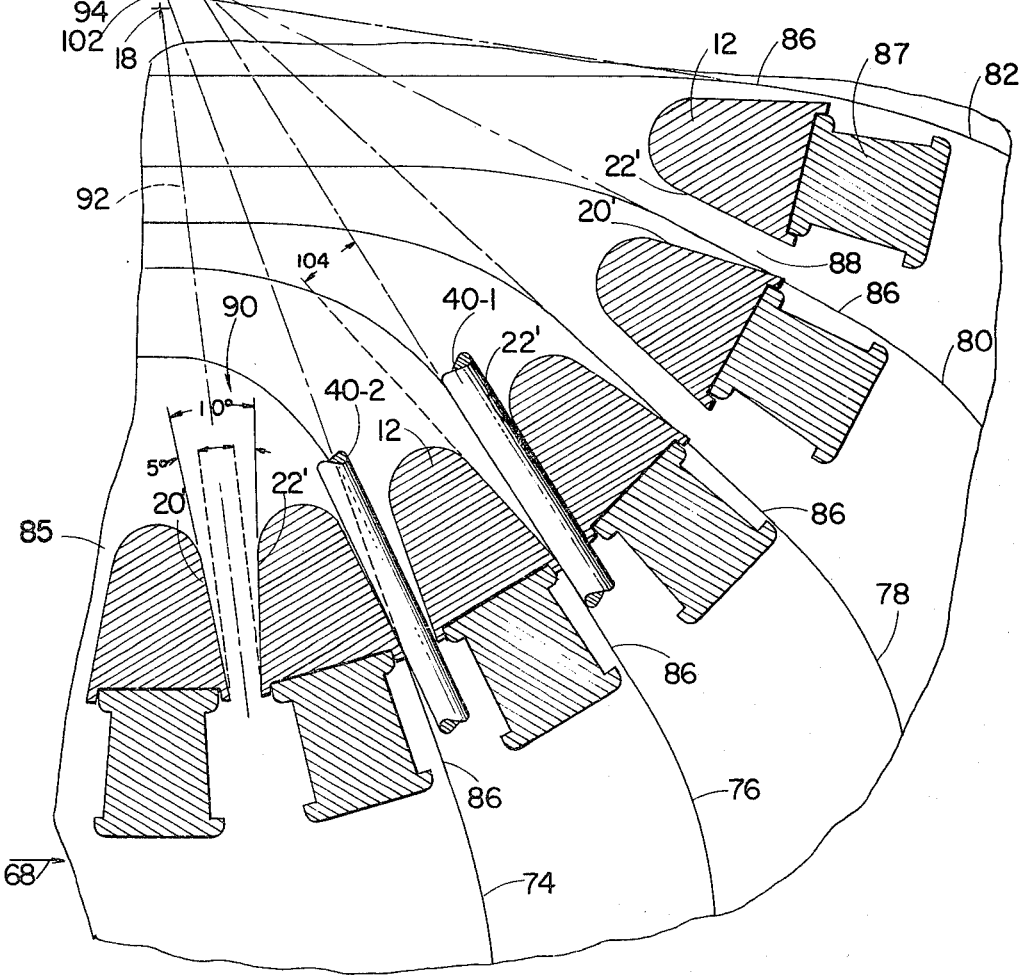
FIG. 6 is a fragmentary cross-sectional view taken generally along the lines 6—6 of FIG. 5 showing the divergent inserter blade gaps of the invention and also showing the winding and insertion attitudes of the coils and FIGS. 7A–C are isometric views showing the relationship of the inserter blades with the coil form and the stator core, and also showing the attitudes of the coils on the inserter blades.

Referring now particularly to FIG. 6 of the drawings, in accordance with the invention, inserter blades 12 have adjacent flat sides 20', 22' disposed with an inwardly facing angle 90 therebetween in place of the former parallel sides 20, 22, as shown in FIG. 1, in order to provide clearance to permit transferring coil 38 from coil form 64 to blades 12 and also to permit coil 38 to pivot to the desired inclined position, as shown by dashed line 54 in FIG. 2. It will be seen that straight blade sides 20', 22' diverge outwardly toward centerline 18 of the cylindrical array of blades 12.

It will be seen that divergent blade gaps 88 are respectively radially aligned with centerline 18, as shown by dashed line 92 in FIG. 6 and that radii 92 bisect angles 90 so that flat, divergent blade sides 20', 22' define equal angles with radii 92. In the illustrated embodiment, inwardly facing angle 90 between blade sides 20', 22' is 10°.

Figure 7A:
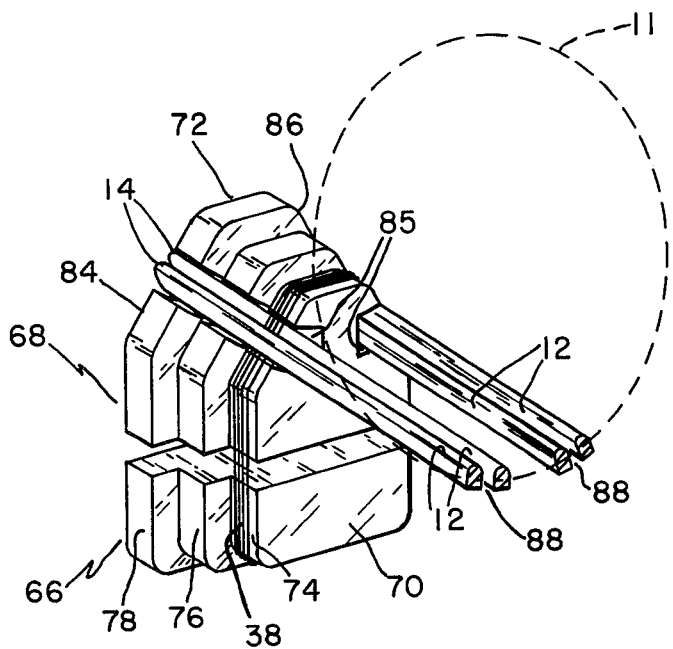
Figure 7B:
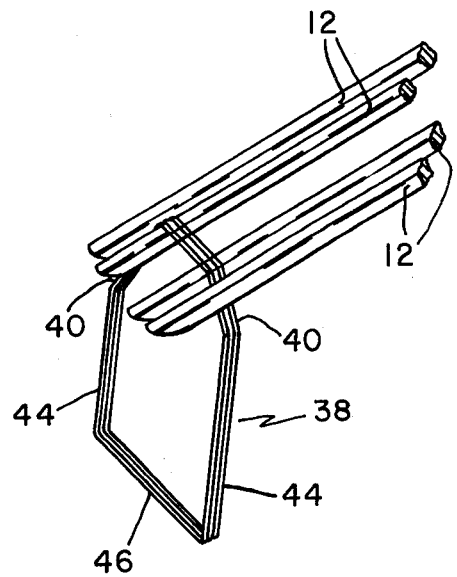
Figure 7C:
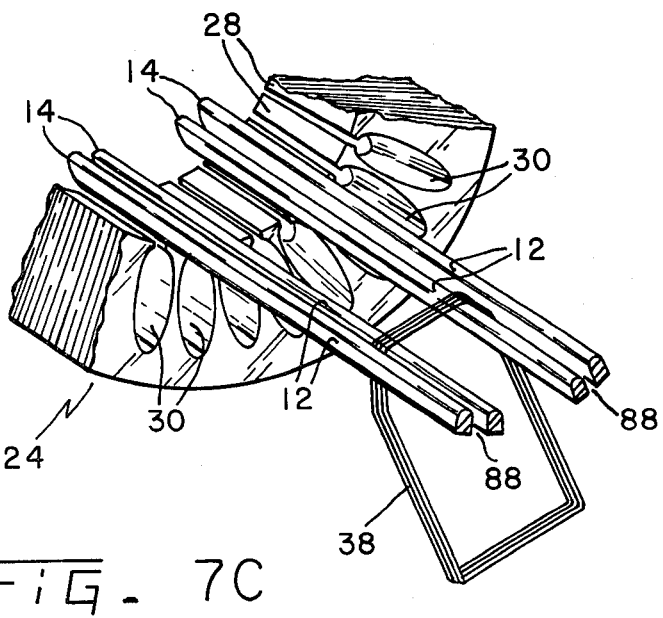

Side portions 84, 86 of steps 74 through 82 of coil form part 68 are respectively arranged so that angled sections 40 of coils 38 wound thereon define angles therebetween slightly less than the angle defined between the respective blade gap radii 92, and with the projected centerlines of angled sections 40 meeting at points spaced outwardly from centerline 18 on the side thereof remote from end section 42, as above described in connection with FIG. 3. It will further be seen that angled sections 40 of coils 38 wound on coil form part 68 will be parallel with flat blade sides 22' adjacent the outside of the coil, as shown at 40—1 in FIG. 6, which permits the entry of blades 12 between the tightly wound remaining turns on coil form 64, as shown in FIG. 5. After collapse of coil form parts 68, 66, the turns of wire are then stripped off of form 64 onto the group of blades 12 spanned by the particular coil with angled sections 40 entering divergent blade gaps 88. With the 10° angle shown between flat blade sides 20', 22', coil 38 wound and transferred to blades 12 at a 90° angle to the blades, as shown in FIG. 7B, may be pivoted to an inclined attitude with respect to the blades, as shown at 54 in FIGS. 2 and 7C, the divergent blade sides permitting angled sections 40 to rotate in a plane relative to the blades so as to contact the blade sides 20' adjacent the inside of the wound coils, as shown at 40—2 in FIG. 6. It will be seen that projections of angled section-forming surfaces 86 of coil form part 68 meet at points 96 through 102 spaced outwardly from centerline 18 on the side thereof remote from end section 42.

While the approximately 10° angle 90 between flat sides 20', 22' of adjacent blades 12 is made equal for all blades in the illustrated embodiment in order to permit the use of identical blades, it will be observed that the angle 90 of the divergent blade gap 88 between each adjacent pair of blades 12 could be designed to allow the exact wire angle change required for each coil span. In the illustrated embodiment in which coils 38 respectively span three, five, seven, nine, and eleven blades 12, it will be seen that the coil spans closest to 90° require the greatest amount of angle change of angled sections 40 of the coils between blades 12 and that the spans above and below 90° require progressively less change. It will be observed in FIG. 6 that the angle of change 104 between angled section-forming sides 84, 86 of the respective coil form step 74 through 82 and the respective flat side surface 20' of a respective blade 12 is 7½° that is the angle between the coil form step and the angularly closest flat side surface 22 is 2½° for the three blade and eleven blade span coils respectively wound on coil form steps 74, 82, and 10° for the five, seven and nine blade span coils respectively wound on coil form steps 76, 78 and 80, for a total angle of change of 5° and 10°, respectively. It will be readily understood that change angles other than 7½° and 10° shown may be used which would, in turn, require correspondingly different angles 90 between flat, divergent blade sides 20', 22'.

While there have been described above the principles of this invention in connection with specific apparatus, it is to be clearly understood that this description is made only by way of example and not as a limitation to the scope of the invention.

What is claimed is:

1. In a method of winding dynamoelectric machine field coils and inserting the same in an internally slotted core member using coil insertion apparatus having a cylindrical array of elongated, parallel, circumferentially spaced blade elements defining equal-width gaps therebetween respectively radially aligned with the centerline of the array, the blade elements respectively having distal ends, the method including the steps of single-layer, precision winding a coil having two converging angled sections respectively joined to opposite end sections, moving the array relative to the coil to a first position in which the distal ends of a group of adjacent blade elements extend into the coil generally at right angles thereto with the angled sections of the coil respectively extending through the two gaps respectively adjacent the outer blade elements of the group and one end section disposed within the array, said two gaps defining a first angle therebetween, moving the array with the coil on said group of blade elements relative to the core member to a second insertion position with the blade elements extending into the bore of the core member and inserting the coil in the core member slots, the improvement comprising: providing the array of blade elements with at least said two gaps tapered in planes perpendicular to the array centerline and having sides which diverge toward the center of the array; winding the coil from wire having a diameter closely approaching the width of the gaps with said two angled sections defining a second angle therebetween slightly smaller than said first angle and with the projected centerlines of said angled sections meeting at a first point spaced outwardly from the centerline of the array on the side thereof remote from said one end section when the array is in said first position thereof, pivoting the coil on the group of blade elements to a position defining an acute angle therewith whereby said two angled sections of said coil project a third angle therebetween slightly larger than said first angle with the projected centerlines of said angled sections meeting at a second point spaced inwardly from the centerline of the array on the side thereof toward said one end section when the array is in said insertion position thereof.

2. The method of claim 1 wherein said second angle is approximately 5° to approximately 10° smaller than said first angle.

3. The method of claim 2 wherein said third angle is approximately 5° to 10° larger than said first angle.

4. The method of claim 3 wherein said acute angle is smaller than approximately 45°.

5. The method of claim 1 or claim 4 wherein said two gaps are provided with flat facing blade element sides which define a small angle therebetween.

6. The method of claim 5 wherein said small angle is approximately 10° and is generally bisected by a radius of the array.

7. The method for claim 5 wherein the outer ones of said sides define an angle therebetween generally equal to said second angle and the inner ones of said sides define an angle therebetween generally equal to said third angle.

8. In apparatus for winding single-layer, precision wound dynamoelectric machine field coils and for inserting the same in an internally slotted core member, the apparatus including form means adapted to have the coils wound thereon and having side portions shaped to form a coil with two angled sections respectively joined to end sections, said coil form means having a distal end with a recess formed therein which communicates with said angled section-forming portions, and insertion apparatus having a cylindrical array of elongated, parallel, circumferentially spaced blade elements defining equal-width gaps therebetween respectively radially aligned with the centerline of the array, said blade elements respectively having distal ends, the diameter of the wire from which the coil is wound approaching the width of the gaps, the array having a first position in which the distal ends of a group of adjacent blade elements extend into the coil form means recess generally at right angles to the coil with the two gaps at the sides of the group respectively exposed to the angled section-shaping portions so that a coil wound on the coil form means may be transferred to said array with said angled sections respectively extending through the two gaps and one end section disposed within the array, the array having a second position with the distal ends of the blade elements extending into the bore of the core member and respectively engaging the teeth thereof and with the two gaps respectively communicating with two winding slots therein so that a coil on the array may be inserted in the two slots, the two gaps defining a first angle therebetween, the improvement comprising: said angled section-shaping portions of the coil form means defining a second angle therebetween slightly smaller than said first angle and having a center spaced outwardly from the centerline of the array on the side thereof remote from the one end section in the first position of the array; said blade elements respectively having opposite sides which define said gaps, the facing sides of each pair of adjacent blade elements diverging toward the center of the array whereby the coils on said group of blade elements may be pivoted to an insertion position defining an acute angle with said blade elements, said two angled sections of the coil projecting a third angle therebetween slightly larger than said first angle and the projected centerlines of said angled sections meeting at a point spaced inwardly from the centerline of the array on the side thereof toward the one end section in said insertion position of the coil.

9. The apparatus of claim 8 wherein said second angle is approximately 5° to approximately 10° smaller than said first angle.

10. The apparatus of claim 9 wherein said third angle is approximately 5° to 10° larger than said second angle.

11. The apparatus of claim 10 wherein said acute angle is smaller than approximately 45°.

12. The apparatus of claim 8 or claim 11 wherein said sides of said blade elements are flat, the facing sides of adjacent blade elements defining a small angle therebetween.

13. The apparatus of claim 12 wherein said small angle is approximately 10° and is generally bisected by a radius of the array.

14. The apparatus of claim 12 wherein the outer ones of the sides of the blade elements which define said two gaps define an angle therebetween generally equal to said second angle, the inner ones of the sides of said last-named blade elements define an angle therebetween generally equal to said third angle.

15. The apparatus of claim 8 wherein said coil form means comprises a plurality of progressively larger steps adapted to have progressively larger coils respectively wound thereon which respectively span progressively greater numbers of said blade elements in said first position of said array, each of said steps having said side portions for forming said angled and end sections, said distal end being at the smallest one of said steps, the second angle of the smallest coil form means step being substantially less than 90° and the second angle of the largest coil form means step being substantially greater than 90°, there being at least one intermediate coil form means step having a second angle closer to 90° than said smallest and largest coil form means steps, the difference between said third angle of said intermediate coil and said second angle of the respective step being larger than the difference between said third angle of said smallest and largest coils and said second angle of the respective steps.

16. The apparatus of claim 15 wherein said second angle for said step for said intermediate coil is approximately 10° smaller than the respective first angle, and said second angle for said steps for said smallest and largest coils is approximately 5° smaller than the respective first angle.

17. In apparatus for winding dynamoelectric machine field coils and inserting the same in an internally slotted core member including a cylindrical array of elongated, parallel, circumferentially spaced blade elements defining equal width gaps therebetween respectively radially aligned with the centerline of the array, the improvement wherein said blade elements respectively have opposite sides which define said gaps, the facing sides of each pair of adjacent blade elements being substantially flat and diverging toward the centerline of the array to define an inwardly facing angle therebetween, the radii of said cylindrical array with which said gaps are aligned respectively substantially bisecting said angles.

18. The apparatus of claim 17 wherein said angles are approximately 10°.

19. The apparatus of claim 17 further including a coil form adapted to have single-layer, precision wound coils wound thereon and having side portions shaped to form a coil with two angled sections respectively joined to end sections, the coil form having an outer end with a recess formed therein which communicates with the angled section-forming portions, the blade elements respectively having distal ends, the coil form and blade array being proportioned so that in one position of the array the distal ends of a group of adjacent blade elements extend into the coil form recess generally at right angles to a coil wound on the form with the two gaps at the opposite sides of the group respectively exposed to the angled section-shaping portions, the radii of the blade array with which the two gaps are respectively aligned defining a second angle therebetween, wherein the angled section-shaping portions of the coil form define a third angle therebetween slightly smaller than said second angle and having a center spaced outwardly from the centerline of the array on the side thereof remote from said group of blade elements in the one position of the array.

20. The apparatus of claim 19 wherein said third angle is approximately 5° to approximately 10° smaller than said second angle.

21. The apparatus of claim 20 wherein said blade element sides are substantially flat.

22. The apparatus of claim 21 wherein the first-named angles are approximately 10°.

23. The apparatus of claim 21 wherein the outer ones of the sides of the blade elements which respectively define the two gaps define an angle therebetween generally equal to said third angle, and the inner ones of the sides of the last-named blade elements define a fourth angle therebetween slightly larger than said second angle.

24. The apparatus of claim 23 wherein said fourth angle is approximately 5° to 10° larger than said third angle.

25. The apparatus of claim 19 in which the coil form comprises a plurality of progressively larger steps each having said side portions for forming said angled and end coil sections, said outer end being at the smallest one of said steps, said steps being adapted to have progressively larger coils respectively wound thereon which respectively span groups of progressively greater numbers of said blade elements in the one position of the array with the span of the smallest coil being substantially less than 90° and the span of the largest coil being substantially greater than 90°, there being at least one intermediate coil having a span closer to 90° than said smallest and largest coils, wherein said third angle of the step for the intermediate coil is larger than said third angle of said steps for the smallest and largest coils.

26. The apparatus of claim 25 wherein said third angle of said step for the intermediate coil is approximately 10° smaller than the respective second angle, and said third angle for said steps of the largest and smallest coils is approximately 5° smaller than the respective second angle.

* * * * *

UNITED STATES PATENT AND TRADEMARK OFFICE
CERTIFICATE OF CORRECTION

PATENT NO. : 4,432,400
DATED : February 21, 1984
INVENTOR(S) : Robert G. Walker

It is certified that error appears in the above—identified patent and that said Letters Patent is hereby corrected as shown below:

Col. 1, line 63, change "to" to --of--.

Col. 3, line 35, change "cricumferentially" to --circumferentially--.

Col. 6, line 3, change "more" to --move--.

Claim 8, col. 9, line 41, change "including form" to --including coil form--.

Signed and Sealed this

Fourth Day of September 1984

[SEAL]

Attest:

GERALD J. MOSSINGHOFF

Attesting Officer

Commissioner of Patents and Trademarks